United States Patent [19]

Azuma

[11] 4,151,448
[45] Apr. 24, 1979

[54] PULSE MOTOR DRIVING SYSTEM

[75] Inventor: Nobuhiro Azuma, Tokorozawa, Japan

[73] Assignee: Kokusai Denshin Denwa Kabushiki Kaisha, Japan

[21] Appl. No.: 826,713

[22] Filed: Aug. 22, 1977

[30] Foreign Application Priority Data

Aug. 24, 1976 [JP] Japan .................................. 51/100892

[51] Int. Cl.² ............................................. H02K 29/00
[52] U.S. Cl. ...................................... 318/138; 318/696
[58] Field of Search ................. 318/696, 138, 254, 685

[56] References Cited

U.S. PATENT DOCUMENTS 3,896,357  7/1975  Tanikoshi ............................ 318/138

Primary Examiner—Gene Z. Rubinson
Attorney, Agent, or Firm—Robert E. Burns; Emmanuel J. Lobato; Bruce L. Adams

[57] ABSTRACT

A pulse motor driving system, in which a rate generator is associated with the motor shaft, so that a rate signal derived therefrom is converted by an integrator into a voltage corresponding to the rotational angle of the motor shaft and optimum field current switching timings are established on the basis of the abovesaid voltage.

2 Claims, 4 Drawing Figures

PULSE MOTOR DRIVING SYSTEM

BACKGROUND OF THE INVENTION

This invention relates to a pulse motor driving system, and more particularly, to a system for switching drive currents for a pulse motor at suitable timings in a case of accelerating the pulse motor to its slewing speed or decelerating it from the slewing speed.

SUMMARY OF THE INVENTION

An object of this invention is to provide a pulse motor driving system ensuring rapid acceleration and deceleration of a motor under various working conditions.

To attain the above object of this invention, a pulse motor driving system is proposed in accordance with this invention, in which a rate generator is associated with the motor shaft, so that a rate signal derived therefrom is converted by an integrator into a voltage corresponding to the rotational angle of the motor shaft and optimum field current switching timings are established on the basis of the abovesaid voltage.

BRIEF DESCRIPTION OF THE DRAWING

The principle, construction and operation of this invention will be clearly understood from the following detailed description taken in conjunction with the accompanying drawings, in which.

DESCRIPTION OF THE PREFERRED EMBODIMENT

Figure 1:
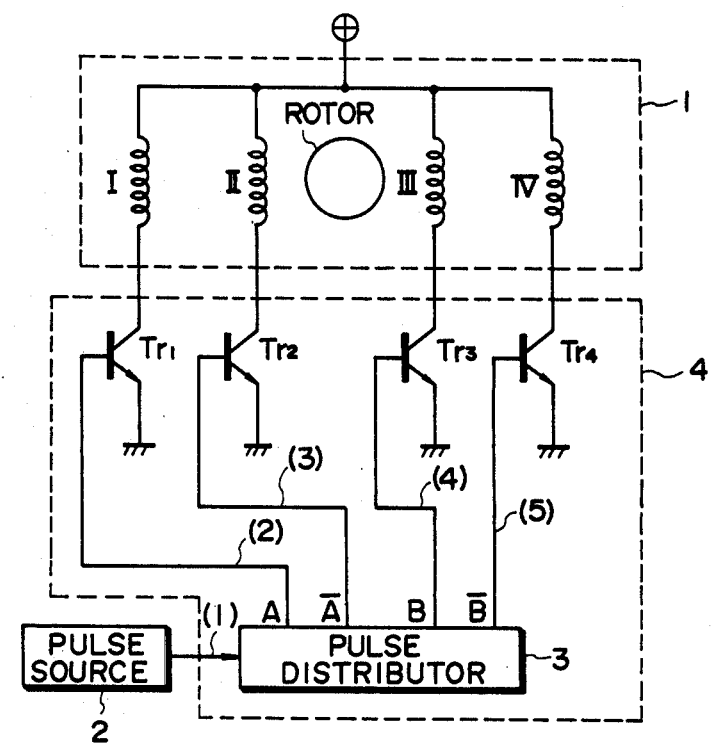
FIG. 1 is a circuit diagram illustrating an example of a conventional pulse motor driving system.
Figure 2:
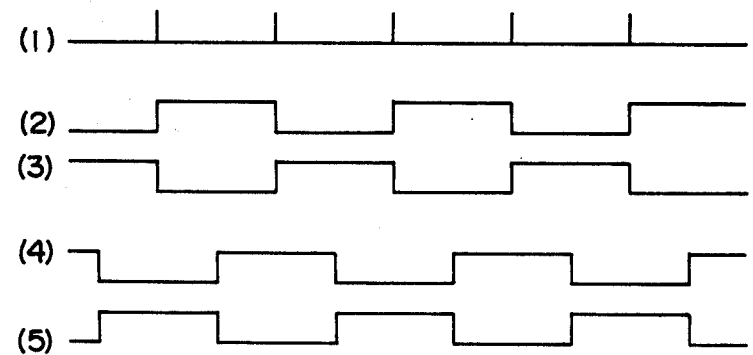
FIG. 2 shows time charts explanatory of the operation of the example shown in FIG. 1.

To make the characteristic feature of this invention against the conventional arts clear, an example of the conventional pulse motor driving system will first be described with reference to FIGS. 1 and 2. A permanent magnet type pulse motor 1 has, for instance, four field windings I, II, III and IV, and is connected to a drive circuit 4 which comprises a pulse distributor 3 and driving transistors, $Tr_1$, $Tr_2$, $Tr_3$ and $Tr_4$. Every time a pulse (1) is applied to the pulse distributor 3 from a pulse source 2, currents to the field windings are switched in a sequential order (for example, in the order of $A\overline{B}$, $AB$, $\overline{A}B$, $\overline{A}\overline{B}$, ...) so that the output shaft of the motor 1 rotates by a constant angle in a step-by-step manner. In a case of accelerating such a motor 1 from its stand-still state up to a slewing speed (usually about 5 to 20 kHz), the pulse-repetition frequency of the pulse source 2 is gradually increased from its initial value of approximately several hundred Hz up to several kHz. In a case of stopping the motor 1 revolving at the slewing speed, the speed is decreased in the reverse order. To shorten the accelerating and decelerating times for rapid acceleration and deceleration of the motor 1, the pulse-repetition frequency must be increased and decreased at a certain rate with respect to time, that is, a specific curve is required for the acceleration and deceleration (for instance, trapezoidal, exponential or cycloidal increase and decrease). Even with this method, however, a load variation may give rise to racing to stop the motor 1 in some cases.

Figure 3:
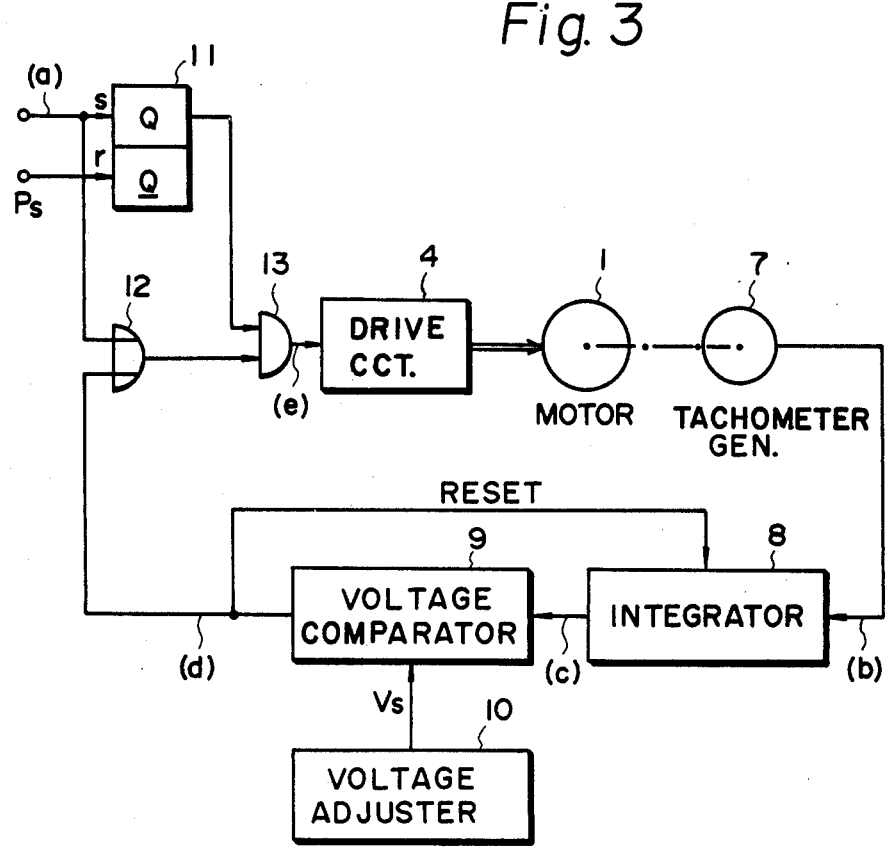
FIG. 3 is a block diagram illustrating an embodiment of the present invention.
Figure 4:
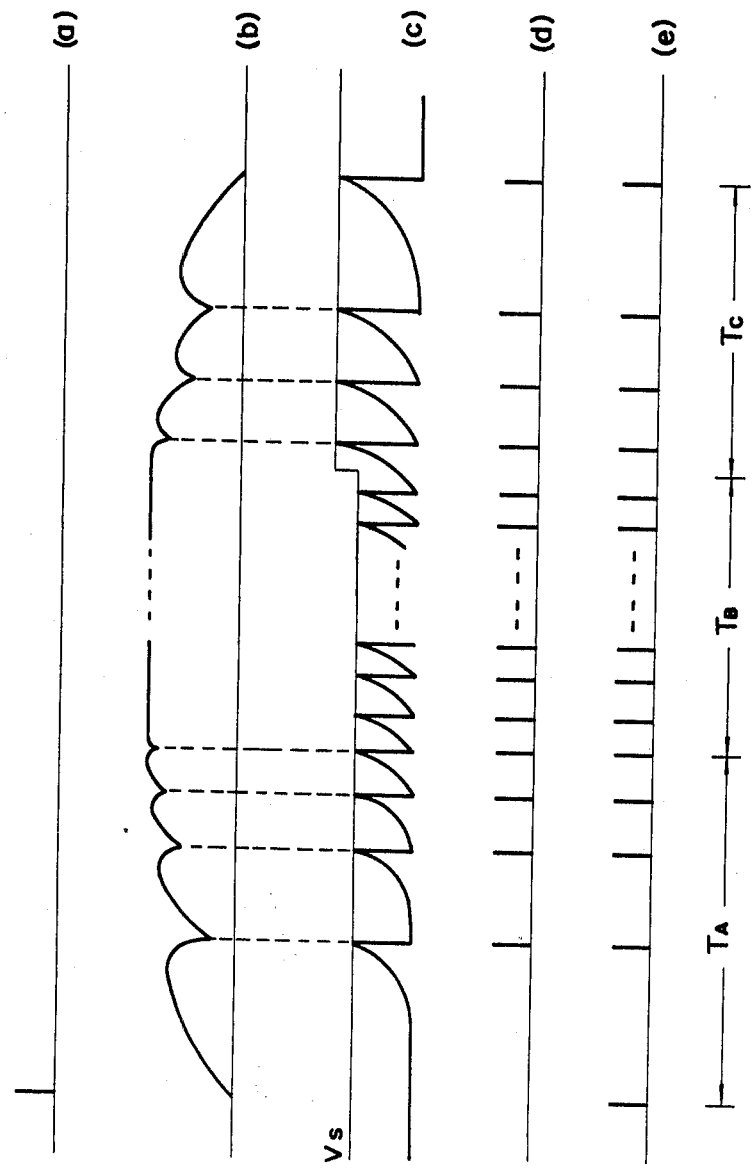
FIG. 4 shows time charts explanatory of the operation of the present invention.

Referring now to FIGS. 3 and 4, the operation of this invention will hereinafter be described. Upon application of a start pulse (a), the output of a flip-flop 11 is set to a "high-potential" state and, at the same time, this pulse is applied to a pulse motor drive circuit 4 through an OR circuit 12 and an AND circuit 13 as the first one of pulses (e). The pulse motor drive circuit 4 identical in construction with the circuit 4 surrounded by dotted lines in FIG. 1 rotates the pulse motor 1 by one step. A rate generator or tachometer generator 7 is mechanically coupled to the shaft of the pulse motor 1 and generates a voltage signal (b) which is proportional to the speed of rotation of the motor 1. The voltage output (b) from the rate generator 7 is integrated by an integrator 8 to obtain a voltage signal (c) representative of a rotational angle of the shaft of the motor 1. On the other hand, a voltage Vs corresponding to the rotational angle of one step of the pulse motor 1 is generated by a voltage adjuster 10, comprising a dc source and a variable resistor, by way of example. When the output from the integrator 8 increases up to the abovesaid voltage Vs, a voltage comparator 9 generates one of output pulses (d). The pulse (d) resets the integrator 8 to perform integration of the next step voltage and is applied through the OR circuit 12 to the pulse motor drive circuit 4.

The abovesaid operations are repeatedly accomplished to gradually accelerate the motor 1 up to the slewing speed. A period TA in FIG. 4 is an acceleration period and a period TB is a slewing speed operation period. Since the influence of a load fluctuation or a voltage fluctuation in the power source of the motor 1 is detected in the form of an output variation of the speed generator 7, the drive switching time of the field windings of the pulse motor 1 is automatically regulated to prevent the motor 1 from hunting. The deceleration of the motor 1 can be achieved by adjusting the detection level Vs of the voltage comparator 9 to the higher level to defer the drive switching as shown as a period TC in FIG. 4.

When the motor 1 is to be stopped, a stop pulse Ps is applied to a reset terminal of the flip-flop 11 to reset its output to the "zero-potential" state, closing the AND circuit 13. As a result of this, the feedback pulses (e) are stopped by the AND circuit 13 from being applied to the pulse motor drive circuit 4, thus stopping the motor 1. The integrator 8 and the voltage comparator 9 employed in this invention can be readily realized with operational amplifiers now on the market.

With this invention the acceleration and deceleration characteristics of the pulse motor can be remarkably improved only by coupling a rate generator to the output shaft of a pulse motor. Consequently, the present invention can provide an inexpensive position control servo of high performance.

What I claim is:

1. A system for driving a pulse motor, comprising:
   drive pulse generating means responsive to input pulses for generating an output pulse in response to each input pulse applied thereto, and for applying the drive pulses in use to a pulse motor having a shaft for rotating the pulse motor shaft in a stepwise manner in response to successive driving pulses;
   a tachometer for developing an output voltage proportional to speed of rotation and connected in use to the pulse motor shaft to develop an output voltage proportional to the speed of rotation of the pulse motor shaft;

a resettable integrator circuit connected to receive and integrate the output voltage of said tachometer and to develop an output voltage equal to the time integral of the output voltage of said tachometer, and said resettable integrator circuit developing in use an output voltage representative of the angle of rotation of the pulse motor shaft;

reference voltage generating means for generating a predetermined DC reference voltage;

a voltage comparator connected to receive the output voltage of said resettable integrator circuit and connected to receive the DC reference voltage for generating an output pulse each time the output of said integrator circuit equals said DC reference voltage;

means defining a circuit path for applying the output pulse from said voltage comparator circuit to said resettable integrator circuit for resetting said integrator circuit each time the output voltage of said integrator equals said DC reference voltage; and control means connected to said voltage comparator and said drive pulse generating means for applying output pulses from said voltage comparator to said drive pulse generating means for enabling said drive pulse generating means to develop a drive pulse for driving the pulse motor each time the output of said integrator circuit equals said DC reference voltage.

2. A system for driving a pulse motor according to claim 1, in which said control means comprises first terminal means receptive of a start pulse, second terminal means receptive of a stop pulse, a flip-flop circuit set by said start pulse and reset by said stop pulse, an OR gate receptive of the output pulses of said voltage comparator and said start pulse, and an AND gate receptive of the output of said OR gate and the set output of said flip-flop circuit to provide said drive pulses at the output thereof.

* * * * *